(12) United States Patent
AbiEzzi

(10) Patent No.: US 10,547,711 B2
(45) Date of Patent: Jan. 28, 2020

(54) USING OFF-SCREEN USER INTERFACE DATA DURING REMOTE SESSIONS

(71) Applicant: VMware, Inc., Palo Alto, CA (US)

(72) Inventor: Salim AbiEzzi, Sammamish, WA (US)

(73) Assignee: VMware, Inc., Palo Alto, CA (US)

( * ) Notice: Subject to any disclaimer, the term of this patent is extended or adjusted under 35 U.S.C. 154(b) by 297 days.

(21) Appl. No.: 14/668,746

(22) Filed: Mar. 25, 2015

(65) Prior Publication Data

US 2016/0285956 A1    Sep. 29, 2016

(51) Int. Cl.
G06F 3/048 (2013.01)
H04L 29/08 (2006.01)
G06F 9/451 (2018.01)

(52) U.S. Cl.
CPC ............. H04L 67/34 (2013.01); G06F 9/452 (2018.02)

(58) Field of Classification Search
CPC .. A63F 13/12; A63F 13/352; A63F 2300/535; A63F 2300/5533; A63F 13/30
See application file for complete search history.

(56) References Cited

U.S. PATENT DOCUMENTS

| | | |
|---|---|---|
| 7,149,776 B1 | 12/2006 | Roy |
| 8,473,958 B2 | 6/2013 | Kannay |
| 8,924,862 B1 | 12/2014 | Luo |
| 9,158,434 B2 | 10/2015 | Beveridge |
| 9,167,020 B2 | 10/2015 | Abdo |
| 9,295,915 B2 * | 3/2016 | Bruno, Jr. ............... A63F 13/12 |
| 9,565,227 B1 | 2/2017 | Helter |
| 9,628,332 B2 * | 4/2017 | Bruno, Jr. ............. A63F 13/335 |
| 2004/0010622 A1 | 1/2004 | O'Neill et al. |
| 2006/0075106 A1 * | 4/2006 | Hochmuth ............ H04L 67/125 709/227 |

(Continued)

FOREIGN PATENT DOCUMENTS

| | | |
|---|---|---|
| JP | 2005-075314 | 3/2005 |
| JP | 2010-026104 | 2/2010 |

(Continued)

OTHER PUBLICATIONS

U.S. Appl. No. 15/172,946, filed Jun. 3, 2016, AbiEzzi et al.

(Continued)

*Primary Examiner* — Namitha Pillai
(74) *Attorney, Agent, or Firm* — Fish & Richardson P.C.

(57) ABSTRACT

Systems and techniques are described for remoting application user interfaces. One of the described techniques includes receiving, by a remote application system, a first user request to access an application from a user device; initiating, by the remote application system, a remote session with the user device that allows user interfaces generated by the application to be presented on the user device and user events associated with the presented user interfaces to be provided as input to the application; during the remote session with the user device; obtaining off-screen user interface data; providing the off-screen user interface data for storage on the user device; receiving data identifying a first user event from the user device; determining that the first user event triggers presentation of the off-screen user interface data stored on the user device; and providing instructions to the user device to present the off-screen user interface data.

20 Claims, 4 Drawing Sheets

(56) References Cited

U.S. PATENT DOCUMENTS

| | | |
|---|---|---|
| 2007/0208808 A1 | 9/2007 | Rust |
| 2009/0112808 A1 | 4/2009 | Howcroft |
| 2009/0235177 A1 | 9/2009 | Saul |
| 2010/0106798 A1 | 4/2010 | Barreto et al. |
| 2010/0135296 A1 | 6/2010 | Hwang |
| 2010/0169790 A1 | 7/2010 | Vaughan |
| 2010/0269046 A1 | 10/2010 | Pahlavan |
| 2010/0306642 A1 | 12/2010 | Lowet |
| 2011/0138295 A1 | 6/2011 | Monnchilov |
| 2011/0246891 A1 | 10/2011 | Schubert |
| 2011/0295974 A1 | 12/2011 | Kashef |
| 2012/0204093 A1 | 8/2012 | Habarakada |
| 2012/0324358 A1 | 12/2012 | Jooste |
| 2013/0290856 A1 | 10/2013 | Beveridge et al. |
| 2013/0290858 A1 | 10/2013 | Beveridge |
| 2013/0346564 A1 | 12/2013 | Warrick |
| 2014/0026057 A1 | 1/2014 | Kimpton |
| 2014/0215457 A1 | 7/2014 | Gava |
| 2014/0258872 A1 | 9/2014 | Spracklen |
| 2014/0325374 A1 | 10/2014 | Dabrowski |
| 2014/0344332 A1 | 11/2014 | Giebler et al. |
| 2014/0355189 A1 | 12/2014 | Nakano |
| 2015/0062183 A1 | 3/2015 | Hong |
| 2015/0089426 A1 | 3/2015 | Ukai |
| 2015/0134840 A1 | 5/2015 | Thompson et al. |
| 2015/0172760 A1 | 6/2015 | AbiEzzi et al. |
| 2015/0199308 A1 | 7/2015 | Cooper |
| 2016/0191604 A1 | 6/2016 | AbiEzzi et al. |
| 2016/0219084 A1 | 7/2016 | AbiEzzi |
| 2016/0248838 A1 | 8/2016 | AbiEzzi et al. |
| 2016/0249006 A1 | 8/2016 | Park |
| 2016/0283070 A1 | 9/2016 | AbiEzzi |
| 2017/0185438 A1 | 6/2017 | Thomas |
| 2017/0300966 A1* | 10/2017 | Dereszynski ...... G06Q 30/0254 |

FOREIGN PATENT DOCUMENTS

| | | |
|---|---|---|
| JP | 2010-126092 | 6/2010 |
| JP | 5994659 | 9/2016 |
| WO | WO 2013/168368 | 11/2013 |

OTHER PUBLICATIONS

U.S. Appl. No. 15/191,927, filed Jun. 24, 2016, AbiEzzi et al.

Write Once, Run Anywhere. Wikipedia, The Free Encyclopedia. Last updated Nov. 20, 2015. Retrieved Apr. 5, 2016. Retrieved from the Internet: URL<https://en.wikipedia.org/wiki/Write_once,_run_anywhere>. 2 pages.

Gear, David Pierce. Surface Book is the Laptop Microsoft Needed Years Ago. WIRED. Published Oct. 6, 2015. Retrieved Feb. 5, 2016. Retrieved from the Internet: URL<http://www.wired.com/2015/10/surface-book-future-of-windows/>. 10 pages.

Massey, Sean P. Horizon View 5.3 Part 13—VMware Blast. The Virtual Horizon. Publication Feb. 25, 2014. Retrieved Feb. 5, 2016. Retrieved from the Internet: URL<https://thevirtualhorizon.com/2014/02/25/horizon-view-5-3-part-13-vmware-blast/>. 9 pages.

Device Driver. Wikipedia, The Free Encyclopedia. Last updated Mar. 29, 2016. Retrieved Apr. 5, 2016. Retrieved from the Internet: URL<https://en.wikipedia.org/wiki/Device_driver>. 7 pages.

International Search Report and Written Opinion in International Application No. PCT/JP2013/002600, dated Jun. 11, 2013, 17 pages (English Translation).

* cited by examiner

USING OFF-SCREEN USER INTERFACE DATA DURING REMOTE SESSIONS

BACKGROUND

This document relates to remoting application user interfaces to user devices.

A user of a user device can interact with an application that is executed on a server remote from the user device using a remote display protocol. The remote display protocol can be used to transfer the display data generated by the application for presentation on the user device and to transfer user events generated at the user device to the application. During execution and based on user input events from the user device, the application can generate updates to the display data, and the remote display protocol can be used to transfer the updated display data to the remote client.

SUMMARY

In general, one aspect of the subject matter described in this document can be embodied in a technique that includes receiving, by a remote application system, a first user request to access an application from a user device; initiating, by the remote application system, a remote session with the user device that allows user interfaces generated by the application to be presented on the user device and user events associated with the presented user interfaces to be provided as input to the application; during the remote session with the user device; obtaining off-screen user interface data; providing the off-screen user interface data for storage on the user device; receiving data identifying a first user event from the user device; determining that the first user event triggers presentation of the off-screen user interface data stored on the user device; and providing instructions to the user device to present the off-screen user interface data.

For a system of one or more computers to be configured to perform particular operations or actions means that the system has installed on it software, firmware, hardware, or a combination of them that in operation cause the system to perform the operations or actions.

Particular embodiments of the subject matter described in this document can be implemented so as to realize one or more of the following advantages. During a remote session, latency between user events being detected by the user device and a presented user interface being updated based on the detected events can be minimized. In particular, by providing a user device with user interface data in advance and then providing instructions to the user device to update a presented user interface with the off-screen user interface data, only data identifying a user event and instructions to present the off-screen user interface data need to be transmitted over a network after the user event has been detected by the user device. Thus, the effects of poor network conditions on a remote session can be mitigated by lowering the latency and decreasing burst traffic.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

This document generally describes a remote application system that provides off-screen user interface data to user devices during remote sessions. During a remote session with a given user device, the remote application system provides off-screen user interface data to the user device. Off-screen user interface data is data that may be used to update a presented user interface in response to a future user event, but that is not to be used to update the user interface currently being presented on the user device. In response to determining that a user event identified in data triggers presentation of the off-screen user interface data, the remote application system provides instructions to the user device that cause the user device to display the off-screen user interface data.

Figure 1:
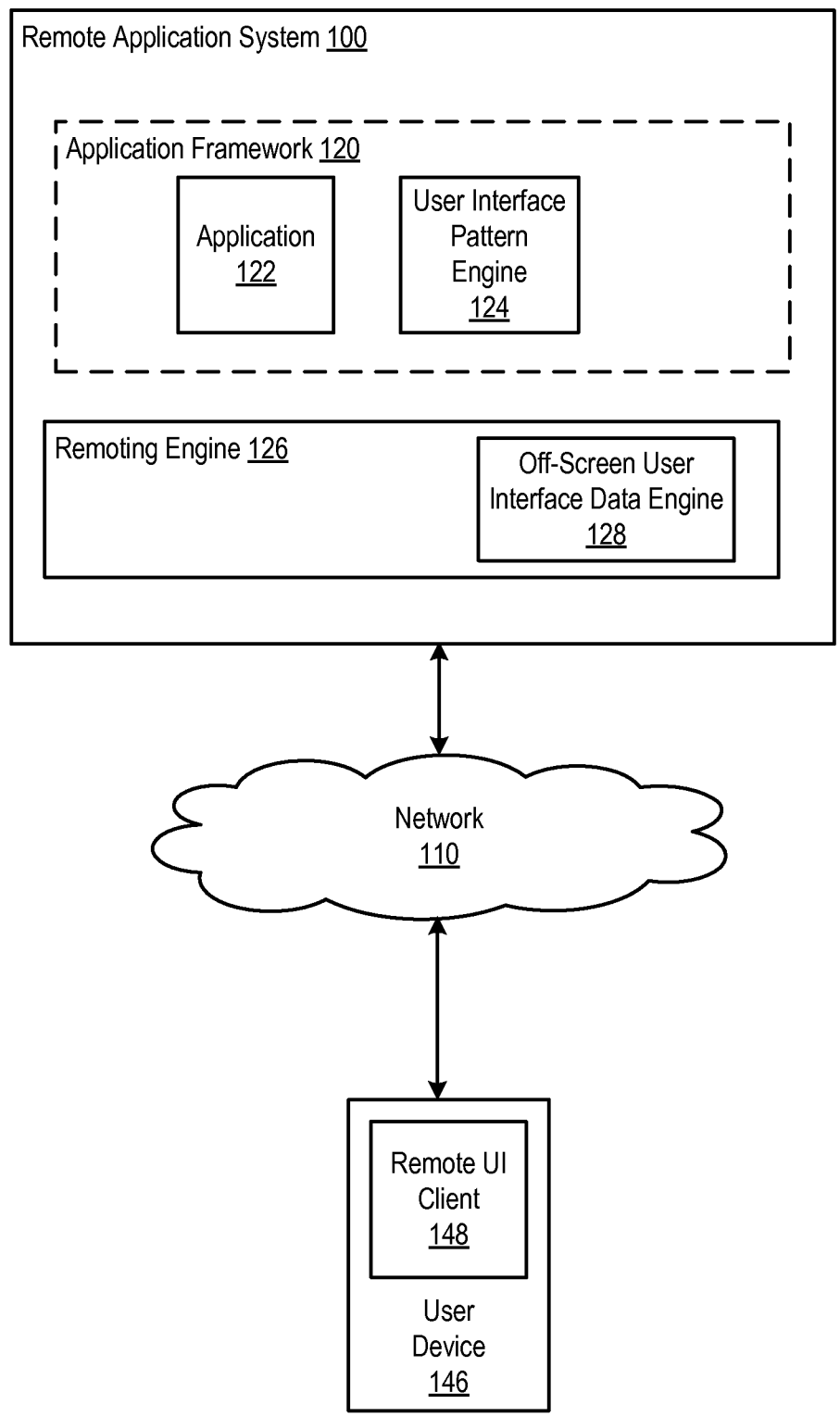
FIG. 1 shows an example remote application system.

FIG. 1 shows an example remote application system 100. The remote application system 100 is an example of a system implemented as computer programs on one or more computers in one or more locations, in which the systems, components, and techniques described below are implemented.

The remote application system 100 manages the execution of one or more applications and allows users of user devices remote from the remote application system 100 to access and interact with the applications managed by the remote application system 100 by providing user interfaces generated by the applications for presentation on the user devices over a network 110. The network 110 can be, e.g., a local area network (LAN), wide area network (WAN), e.g., the Internet, a cellular data network, or a combination thereof.

In order to allow the users to interact with the application, the remote application system 100 also receives data identifying user events associated with the presented user interfaces and provides those user events as inputs to the applications executing on the remote application system 100. For example, the remote application system 100 can allow a user of a user device 146 to access and interact with an application 122 executing within an application framework 120 on the remote application system 100.

The user device 146 can be any of various user computers that have various display properties and that accept various user input modalities. For example, the user device 146 may be a mobile device, e.g., a smartphone or a tablet computer, a desktop or laptop computer, a network-connected television, and so on.

In some implementations, to account for the different display and input capabilities of different kinds of user devices, the application 122 includes multiple user interface code paths. Each of the user interface code paths, when executed, generates a user interface that is specific to a respective class of user devices. For example, one of the user interface code paths may generate a user interface for user devices that accept touch input, that have displays of specified sizes, and that display output at a specified range of resolutions. As another example, a different one of the user interface code paths may generate a user interface for user devices that accept keyboard and mouse input. As another example, a different one of the user interface code paths may generate a user interface for user devices that accept voice input in addition to touch input. In some other implementations, however, the application 122 includes a single user interface code path that generates the user interface for the application 122.

In order to allow a user of the user device 146 to interact with an application managed by the remote application system 100, the user device 146 includes a remote user interface client 148 that users of the user device 146 can use to interact with the application 122 or with other applications executing on the remote application system 100. In some implementations, the remote user interface client 148 is a special-purpose process executing on the user device 146. In some other implementations, the remote user interface client 148 is a web browser executing on the user device 146.

In particular, a user of one of the user devices 146 can submit a request to the remote application system 100 through the remote user interface client 148 executing on the user device 146 to access the application 122. A remoting engine 126 in the remote application system 100 receives the request from the remote user interface client 148 to access the application 122 and causes the application 122 to generate a user interface. In implementations where the application 122 includes multiple user interface code paths, the remoting engine 126 classifies the user device 146 into a device class and then causes the application 122 to generate a user interface by executing the user interface code path corresponding to the device class. The remoting engine 126 can classify the user device 146 into a device class based on identifying information for the user device 146 received with the request. For example, the identifying information can include the device type of the user device, e.g., mobile phone, tablet, laptop computer, desktop computer, television, and so on, and the input styles accepted by the user device, e.g., touch input, mouse input, keyboard input, infrared (IR) remote, voice input, and so on. As another example, the identifying information can also include information characterizing the display of the user device, e.g., the size of the display, e.g., the x and y dimensions of the display, and the resolution of the display.

The remoting engine 126 then provides the user interface generated by the application 122 to the requesting user device for presentation to the user by the remote user interface client 148 executing on the user device 146. Generally, the remoting engine 126 transmits the user interface data to the remote user interface client 148 executing on the user device 146 using a remote display protocol. In some implementations, the remote display protocol is a pixel-level protocol e.g., the Blast protocol or the remote desktop protocol (RDP), that compresses, encrypts and transports image pixels to the remote user interface client 148 executing on the user device 146. The remote user interface client 148 in turn causes the user device 146 to decrypt, decompress, and display the image pixels. In some other implementations, the remoting engine 126 can provide the user interface data using a higher-level protocol. For example, the higher-level protocol may be a protocol that provides the user interface data using a page layout language with client-side scripting, e.g., a protocol that provides the user interface data in a hypertext markup language (HTML) document with Cascading Style Sheets (CSS) and JavaScript. As another example, the higher-level protocol may be a geometry-based protocol, e.g., a graphics device interface (GDI) protocol.

While the user interface is being displayed to the user, the remote user interface client 148 is configured to detect user events associated with the displayed user interface and provide data identifying the user events to the remoting engine 126. For example, the remote user interface client 148 can detect user events, e.g., a click or touch input on the user interface or a text input or voice command submitted by a user while the user interface is active on the user device, and provide data identifying the user events to the remoting engine 148, e.g., data identifying the location of the user event, the type of the user event, and other user event parameters.

Once the remoting engine 126 receives data identifying a user event, the remoting engine 126 provides the user event as input to the application 122. If the input causes a change to the user interface, the remoting engine 126 receives the updated user interface data from the application 122 and provides the updated user interface data for presentation to the user by the remote user interface client 148, e.g., using the remote display protocol. The continuing exchange of user interface data and data identifying user events between the user device 146 and the remote application system 100 will be referred to in this specification as a "remote session" between the user device 146 and the remote application system 100.

The remote application system 100 may host the application 122 and allow users of the system to interact with the application 122 in any of a variety of ways. For example, the application 122 may be hosted in a virtual machine, on a Remote Desktop Session Host (RDSH) server, or in a container in a web server. As another example, the remote application system 100 may host the application 122 as a software as a service (SaaS) application, i.e., by hosting the application 122 on multiple servers that are fronted by a load balancer, with different instances of the application 122 serving different users.

The application framework 120 in which the application 122 executes also includes a user interface pattern engine 124. The user interface pattern engine 124 interacts with the application 122 to obtain off-screen user interface data from the application 122.

Off-screen user interface data is data that may be used to update a presented user interface in response to a future user event, but that is not to be used to update the user interface currently being presented on the user device 146.

In particular, as the application 122 generates user interface data in response to user events, the user interface pattern engine 124 can prompt the application 122 to generate additional user interface data that is treated as off-screen user interface data. The user interface pattern engine 124 can prompt the application 122 using a probabilistic predictive model. The predictive model receives information defining the current state of the remote session, e.g., the user event that has been most recently received from the user device 146, the latest user interface update generated by the application 122, or both, and generates a respective probability for each of a set of possible user events. The probability assigned to a given user event is a probability that the user event will be the next user event received from the user device 146 during the remote session. In some implementations, the predictive model is trained using user event data aggregated from multiple users' interactions with the application 122. Furthermore, in some implementations, the predictive model is personalized according to the past behavior of the user of the user device 146.

Once the predictive model has generated the probabilities, the user interface pattern engine 124 can request additional user interface data from the application 122 by providing one or more of the user events having the highest probabilities as inputs to the application 122 and receiving, in response, additional user interface data for each of the user events from the application 122. The user interface pattern engine 124 can treat the additional user interface data as off-screen user interface data and can associate the user interface data with the possible user event for which it was generated by the application 122. In some implementations, the user interface pattern engine 124 includes data with the request indicating that the request is a request for off-screen user interface data rather than for presentation user interface data. Including this data with the request allows the application to process the request using a separate thread from the main thread being used to generate presentation user interface data. If the off-screen user interface data is presented to the user, the application can use the separate thread to update the main thread, allowing the application to efficiently respond to user events.

In order to transmit the off-screen user interface data to the user device 148, the remoting engine 126 includes an off-screen user interface data engine 128. During remote sessions, the off-screen user interface data engine 128 provides off-screen user interface data to the remote user interface client 148 that allows the remote user interface client 148 to, in response to instructions received from the remoting engine 126, update the presented user interface without needing to receive updated user interface data from the remote application system 100.

In particular, during a remote session with the remote application system 100 in which the user of the user device 146 is interacting with the application 122, the application 122 or the user interface pattern engine 124 may generate off-screen user interface data and provide the off-screen user interface data to the off-screen user interface data engine 128. The off-screen user interface data engine 128 receives the off-screen user interface data and provides the data to the remote user interface client 148, e.g., along with other user interface data or without providing any other user interface data.

Once received, the remote user interface client 148 can store the off-screen user interface data locally and continue to detect user events and provide data identifying the user events to the remote application system 100.

When a user event is received by the remote application system 100, the off-screen user interface data engine 128 can determine whether the user event triggers the display of the off-screen user interface data. If the user event triggers the display of the off-screen user interface data, the off-screen user interface data engine 128 can send instructions to the remote user interface client 148 to update the presented user interface using the off-screen user interface data. If the user event does not trigger the display of the off-screen user interface data the user event is processed normally, e.g., provided to the application 122 as input. In particular, when the off-screen user interface data engine 128 receives a user event, the off-screen user interface data engine 128 can determine whether the event has off-screen user interface data associated with it, i.e., whether the user event was previously provided as input to the application 122 in order to generate off-screen user interface data. If the user event has associated off-screen user interface data, the off-screen user interface data engine 128 can send instructions to the remote user interface client 148 to update the presented user interface using the off-screen user interface data associated with the user event.

For example, in some cases, the data that is being presented by the remote user interface client 148 may be an electronic document that can be scrolled linearly, e.g., up and down. By using off-screen user interface data, the user may be given the opportunity to scroll the document up and down by storing off-screen user interface data on the user device that includes portions of the document that are adjacent to the currently presented portion. In particular, in response to receiving a user event that either loads the document for presentation or scrolls the document, the user interface pattern engine 124 can prompt the application 122 to generate off-screen user interface data in response to the user scrolling the document up and in response to the user scrolling the document down. The off-screen user interface data can then be provided to the user device 146 while the user is viewing the currently displayed data, i.e., before the user has submitted another user event. When the user submits an input scrolling the document up or down, the user interface client 148 can transmit data identifying the input to the remote application system 100. In response, the remote application system 100 can, rather than having to transmit additional user interface data, provide instructions to the user interface client 148 to cause the user interface client 148 to display the appropriate off-screen user interface data that is already stored locally on the user device 146. Similarly this technique can be applied to other user interfaces, e.g., slide shows, panning or zooming in on a map or an image, eBook reader application functionalities. This technique can also be generalized to a hierarchical menu based UI and other general user interface patterns.

Figure 2:
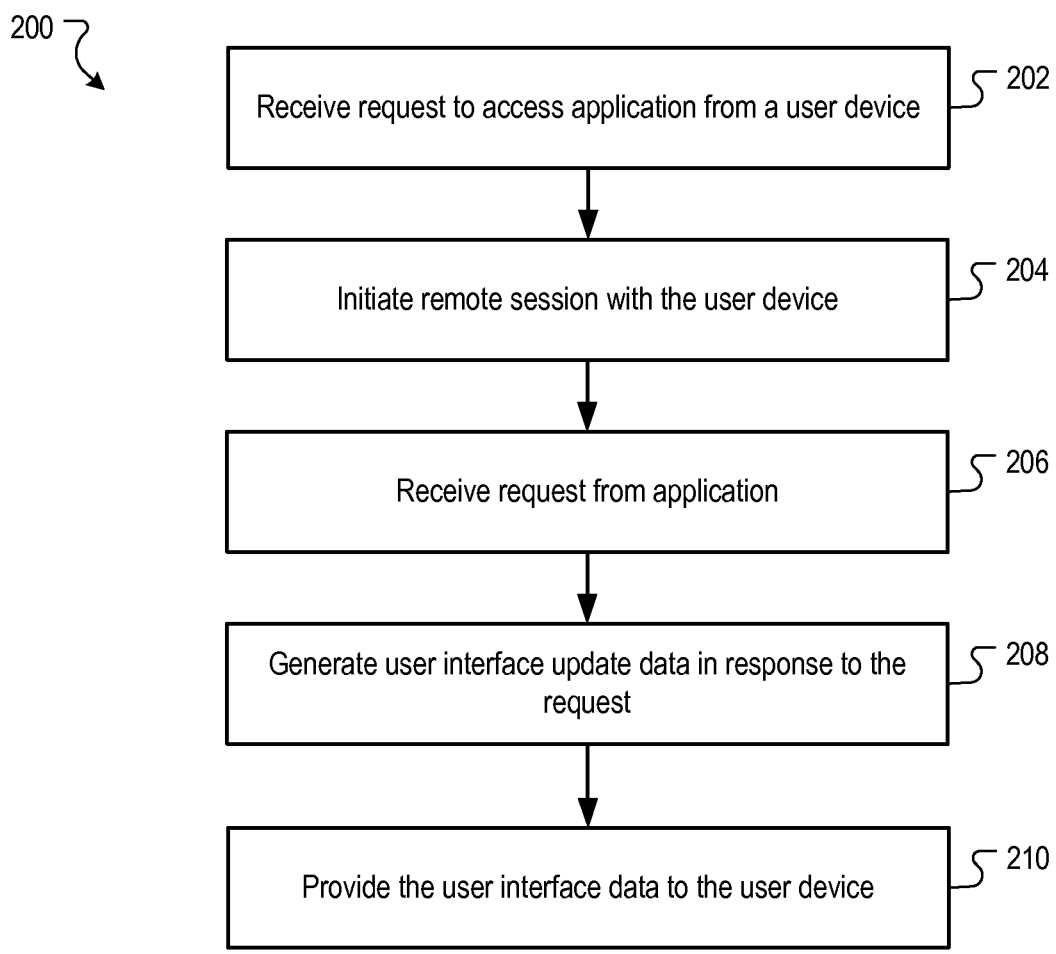
FIG. 2 is a flow chart of an example technique for translating a request received from an application into user interface update data by applying a user interface modification function.

FIG. 2 is a flow chart of an example technique 200 for translating a request received from an application into user interface update data by applying a user interface modification function. The example technique 200 is performed by a system of one or more computers. For example, the technique 200 may be performed by a remote application system, e.g., the remote application system 100 of FIG. 1.

The system receives a request to access an application managed by the system from a user device (step 202). For example, the system can receive the request from a user interface client executing on the user device.

The system initiates a remote session with the user device (step 204). During the remote session, the system provides user interface data generated by the application for presentation on the user device and receives from the user device data identifying user events associated with the presented user interface. The system provides the received user events as input to the application and, if the user events cause a change to the current user interface, receives updated user interface data from the application and provides the updated user interface data for presentation on the user device.

During the remote session, the system receives a request from the application (step 206). The request identifies a user interface modification function and parameters for applying the function, e.g., the content to which the user interface modification function is to be applied. The user interface modification function is one of a predetermined set of user interface modification functions maintained by the system.

The system generates user interface update data in response to the request (step 208). In particular, the system applies the requested user interface modification function using the parameters specified in the request. If the system maintains multiple versions of the requested user interface modification function, the system applies the version of the user interface modification function that is appropriate to user devices of the device class to which the user interface belongs.

The system provides the user interface update data for presentation on the user device (step 210).

Figure 3:
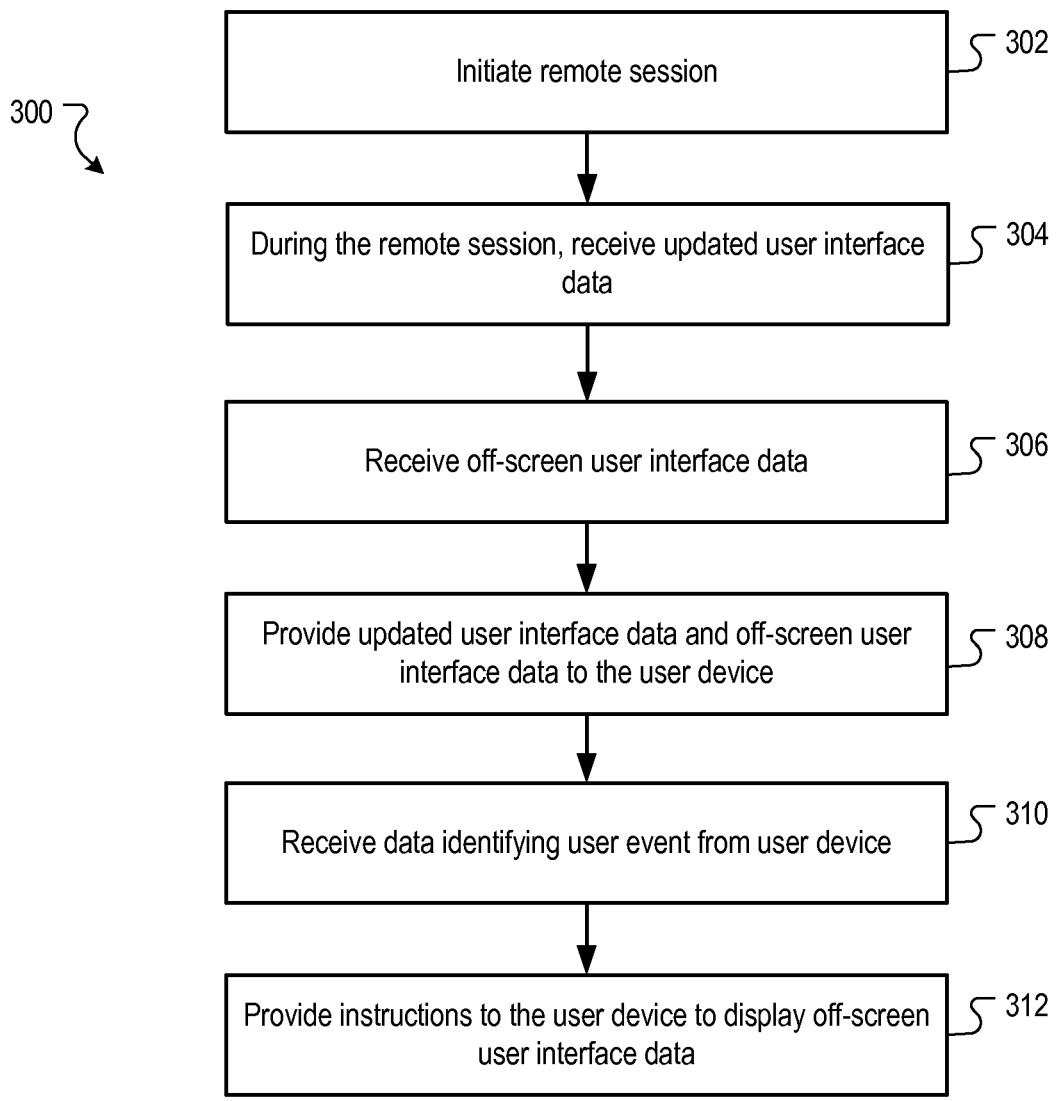
FIG. 3 is a flow chart of an example technique for providing off-screen user interface data to a user device during a remote session.

FIG. 3 is a flow chart of an example technique 300 for providing off-screen user interface data to a user device during a remote session. The example technique 300 is performed by a system of one or more computers. For example, the technique 300 may be performed by a remote application system, e.g., the remote application system 100 of FIG. 1.

The system initiates a remote session with a user device (step 302). In particular, during the remote session, the system provides user interface data generated by an application managed by the user device for presentation on the user device while the user device provides data identifying user events detected by the user device that are associated with the presented user interface to the system.

During the session, the system obtains updated user interface data and off-screen user interface data (step 304). The updated user interface data is data that is to be used to update the user interface currently being presented on the user device. The off-screen user interface data is user interface data that may be used in updating the user interface at a later time.

In some cases, the updated user interface data and the off-screen user interface data may be received from the application managed by the user device. That is, the application may be configured to, when generating updated user interface data, also generate off-screen user interface data that the application has determined may be used to update the user interface at a later time.

In some other cases, the updated user interface data and the off-screen user interface data may be generated by the application in response to a request received from a user interface pattern engine executing in an application framework that is maintained by the system. In particular, the user interface pattern engine may be configured to use a predictive model to determine probabilities that represent predicted likelihoods that corresponding user events will be the next event received from the user device. The user interface pattern engine may then submit one or more most probable events to the application in order to cause the application to generate off-screen user interface data corresponding to those events.

The system provides the updated user interface data and off-screen user interface data to the user device (step 306). For example, the system can provide the updated user interface data and the off-screen user interface data to the remote user interface client executing on the user device.

The system receives data identifying a user event from the user device (step 308).

The system determines that at least a portion of the off-screen user interface data stored on the user device should be displayed in response to the user event (step 310). In particular, the system can determine, from data associating future user events with off-screen user interface data, that the user event is associated with off-screen user interface data. That is, the system can determine that the user event was one of the user events in response to which off-screen user interface data was previously generated by the application.

The system provides instructions to display the off-screen user interface data to the user device (step 312). In particular, the system provides the instructions without needing to provide the off-screen user interface data, which is already saved locally on the user device. Therefore, the latency for the user participating in the remote session can be reduced, as only the data identifying the user event and the instructions need to be sent over a network in order for the user interface being presented to the user to be updated. In some cases, the system may receive additional off-screen user interface data from the application or the user interface pattern engine and provide the additional off-screen user interface data to the user device, e.g., with the instructions or separately after transmitting the instructions.

In some implementations, the system can manage the user device memory that is accessible by the remote user interface client executing on the user device, including deleting stale off-screen user interface data from the user device memory. For example, the system can cause the remote user interface client executing on the user device to store off-screen user interface data in a cyclical buffer, so that the least likely or stale data is automatically over written by newly incoming data.

Figure 4:
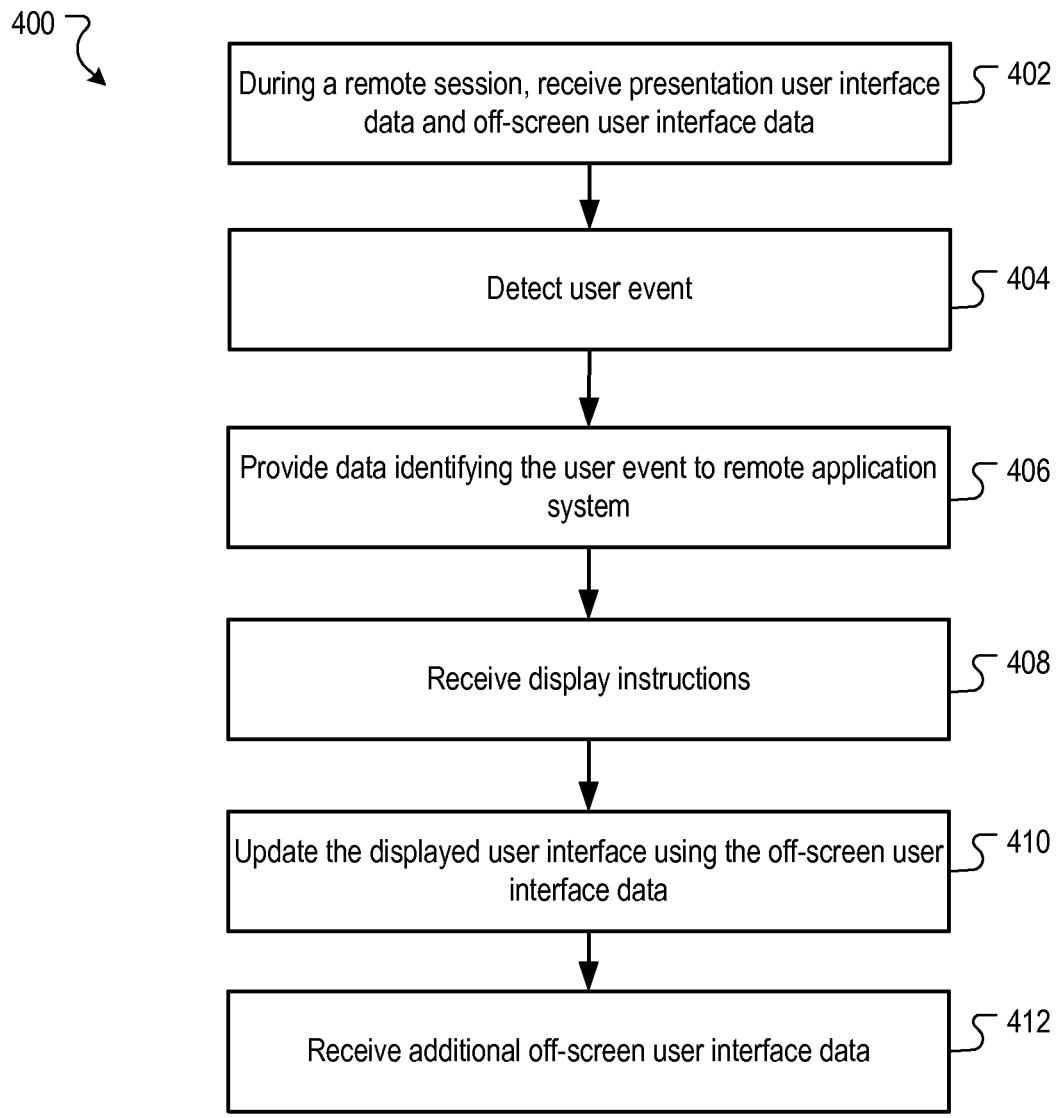
FIG. 4 is a flow chart of an example technique for displaying off-screen user interface data during a remote session Like reference numbers and designations in the various drawings indicate like elements.

FIG. 4 is a flow diagram of an example process 400 for displaying off-screen user interface data during a remote session. The example technique 400 is performed by a user device, e.g., the user device 146 of FIG. 1, that is in communication with a remote application system, e.g., the remote application system 100 of FIG. 1.

The user device initiates a remote session with a remote application system that allows a user of the user device to interact with an application managed by the remote application system (step 402). In particular, during the remote session, the remote application system provides user interface data generated by the application for presentation on the user device while the user device provides data identifying user events detected by the user device that are associated with the presented user interface to the remote application system.

During the remote session, the user device receives presentation user interface data and off-screen user interface data from the remote application system (step 404). The presentation user interface data is user interface data that is to be used to update the user interface currently being presented by the user device. The off-screen user interface data is data that is not for immediate presentation, but that may be presented by the user device at a later time.

The user device updates the currently presented user interface using the presentation user interface data and stores the off-screen user interface data locally on the user device (step 406).

The user device detects a user event associated with the user interface and provides data identifying the user event to the remote application system (step 408).

The user device receives instructions to update the user interface data using the off-screen user interface data from the remote application system (step 410). In particular, rather than providing additional user interface data to be used to update the user interface in response to the user event, the remote application system provides instructions to the user device that indicate that the user device should update the user presented user interface using off-screen user interface data stored locally on the user device. In some cases, the instructions may also specify the portion of the off-screen user interface data stored on the user device that should be used. For example, when the presented user interface is presenting a portion of an electronic document, the presentation user interface sent to the user device may be a current page of the electronic document, while the off-screen user interface data may include both the preceding page of the electronic document and the subsequent page of the electronic document. In this example, the instructions received by the user device may instruct the user device to present either the preceding page or the subsequent page, depending on the user event that was detected.

The user device updates the user interface data in accordance with the received instructions (step 412). In particular, the user device retrieves the off-screen user interface data from the local storage and presents the off-screen user interface data or, if appropriate, the portion of the off-screen user interface data that was identified in the received instructions. In some cases, the user device may receive additional off-screen user interface data for use in updating the user interface in response to future detected user events.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, by a remote application system, a first user request to access an application from a user device;
initiating, by the remote application system, a remote session with the user device that allows user interfaces generated by the application executing on the remote application system to be presented on the user device and user events associated with the presented user interfaces to be provided as input to the application; and
during the remote session with the user device in which a user interface generated by the application is presented on the user device:
obtaining off-screen user interface data, wherein off-screen user interface data is user interface display data not currently being presented on the user device but having a threshold probability of being used to update a user interface of the remote session in response to a future user event received from the user device providing input to the application, wherein the off-screen user interface data is not used to update the currently presented user interface on the user device, and wherein the threshold probability is based on a current state of the remote session and past interactions with the application by one or more users;
providing the off-screen user interface data for storage on the user device;
receiving, at the remote application system, data identifying a first user event from the user device;
determining that the first user event triggers presentation of the off-screen user interface data stored on the user device; and
in response to the determining, updating the user interface, of the remotely accessed application, presented on the user device, wherein updating the user interface of the application includes providing instructions to the user device, from the remote application system, to update the application user interface by presenting the off-screen user interface data previously provided for storage on the user device instead of sending corresponding user interface updates to the user device from the remote application system.

2. The method of claim 1, further comprising:
providing presentation user interface data to the user device, wherein the presentation user interface data is user interface data for use in updating a user interface generated by the application being presented by the user device.

3. The method of claim 2, further comprising:
receiving, by the user device, the presentation user interface data and off-screen user interface data;
updating, by the user device, the user interface generated by the application being presented by the user device using the presentation user interface data;
storing, by the user device, the off-screen user interface data in local storage;
detecting the first user event associated with the user interface;
transmitting, by the user device, the data identifying the first user event to the remote application system;
receiving, from the remote application system, the instructions to present the off-screen user interface data; and in response to receiving the instructions, presenting the off-screen user interface data.

4. The method of claim 1, wherein obtaining the off-screen user interface data comprises:
obtaining the off-screen user interface data from the application.

5. The method of claim 4, wherein obtaining the off-screen user interface data from the application comprises:
submitting a request for off-screen user interface data to the application; and
obtaining the off-screen user interface data from the application in response to the request.

6. The method of claim 5, wherein submitting the request for off-screen user interface data comprises:
submitting a first potential future user event to the application, and wherein obtaining the off-screen user interface data from the application comprises:
obtaining the off-screen user interface data from the application in response to submitting the first potential future user event to the application; and
associating the off-screen user interface data with the first potential future user event.

7. The method of claim 6, wherein determining that the first user event triggers presentation of the off-screen user interface data stored on the user device comprises:
determining that the first user event matches the first potential future user event.

8. The method of claim 6, further comprising:
processing a current state of the remote session using a predictive model to obtain a respective probability for each of a plurality of potential future user events; and
selecting one or more potential future user events from the plurality of potential future user events based on the probabilities, the one or more potential future user events including the first potential user event.

9. The method of claim 8, wherein the predictive model is personalized and trained for a user of the user device.

10. The method of claim 8, wherein the predictive model is personalized and trained for a user of the user device.

11. The method of claim 1, wherein the application comprises a plurality of user interface code paths, and wherein each user interface code path, when executed, generates a user interface that is specific to a respective one of a plurality of user device classes.

12. A system comprising a remote application system, wherein the remote application system comprises one or more computers and one or more storage devices storing instructions that when executed by the one or more computers cause the one or more computers to perform first operations comprising:
receiving a first user request to access an application from a user device;
initiating a remote session with the user device that allows user interfaces generated by the application executing on the remote application system to be presented on the user device and user events associated with the presented user interfaces to be provided as input to the application; and
during the remote session with the user device in which a user interface generated by the application is presented on the user device:
obtaining off-screen user interface data, wherein off-screen user interface data is user interface display data not currently being presented on the user device but having a threshold probability of being used to update a user interface of the remote session in response to a future user event received from the user device providing input to the application, wherein the off-screen user interface data is not used to update the currently presented user interface on the user device, and wherein the threshold probability is based on a current state of the remote session and past interactions with the application by one or more users;
providing the off-screen user interface data for storage on the user device;
receiving, at the remote application system, data identifying a first user event from the user device;
determining that the first user event triggers presentation of the off-screen user interface data stored on the user device; and
in response to the determining, updating the user interface, of the remotely accessed application, presented on the user device, wherein updating the user interface of the application includes providing instructions to the user device, from the remote application system, to update the application user interface by presenting the off-screen user interface data previously provided for storage on the user device instead of sending corresponding user interface updates to the user device from the remote application system.

13. The system of claim 12, the first operations further comprising:
providing presentation user interface data to the user device, wherein the presentation user interface data is user interface data for use in updating a user interface generated by the application being presented by the user device.

14. The system of claim 13, further comprising the user device, wherein the user device is configured to perform second operations comprising:
receiving the presentation user interface data and off-screen user interface data;
updating the user interface generated by the application being presented by the user device using the presentation user interface data;
storing the off-screen user interface data in local storage;
detecting the first user event associated with the user interface;
transmitting the data identifying the first user event to the remote application system;
receiving, from the remote application system, the instructions to present the off-screen user interface data; and
in response to receiving the instructions, presenting the off-screen user interface data.

15. The system of claim 12, wherein obtaining the off-screen user interface data comprises:
obtaining the off-screen user interface data from the application.

16. The system of claim 15, wherein obtaining the off-screen user interface data from the application comprises:
submitting a request for off-screen user interface data to the application; and
obtaining the off-screen user interface data from the application in response to the request.

17. The system of claim 16, wherein submitting the request for off-screen user interface data comprises:
submitting a first potential future user event to the application, and wherein obtaining the off-screen user interface data from the application comprises:
obtaining the off-screen user interface data from the application in response to submitting the first potential future user event to the application; and associating the off-screen user interface data with the first potential future user event.

18. The system of claim 17, wherein determining that the first user event triggers presentation of the off-screen user interface data stored on the user device comprises:
    determining that the first user event matches the first potential future user event.

19. The system of claim 17, the first operations further comprising:
    processing a current state of the remote session using a predictive model to obtain a respective probability for each of a plurality of potential future user events; and
    selecting one or more potential future user events from the plurality of potential future user events based on the probabilities, the one or more potential future user events including the first potential user event.

20. A computer program product encoded on one or more non-transitory computer storage media, the computer program comprising instructions that when executed by one or more computer cause the one or more computers to perform operations comprising:
    receiving, by a remote application system, a first user request to access an application from a user device;
    initiating, by the remote application system, a remote session with the user device that allows user interfaces generated by the application executing on the remote application system to be presented on the user device and user events associated with the presented user interfaces to be provided as input to the application; and
    during the remote session with the user device in which a user interface generated by the application is presented on the user device:
        obtaining off-screen user interface data, wherein off-screen user interface data is user interface display data not currently being presented on the user device but having a threshold probability of being used to update a user interface of the remote session in response to a future user event received from the user device providing input to the application, wherein the off-screen user interface data is not used to update the currently presented user interface on the user device, and wherein the threshold probability is based on a current state of the remote session and past interactions with the application by one or more users;
        providing the off-screen user interface data for storage on the user device;
        receiving, at the remote application system, data identifying a first user event from the user device;
        determining that the first user event triggers presentation of the off-screen user interface data stored on the user device; and
        in response to the determining, updating the user interface, of the remotely accessed application, presented on the user device, wherein updating the user interface of the application includes providing instructions to the user device, from the remote application system, to update the application user interface by presenting the off-screen user interface data previously provided for storage on the user device instead of sending corresponding user interface updates to the user device from the remote application system.

\* \* \* \* \*